United States Patent [19]

Shank et al.

[11] Patent Number: 4,519,722
[45] Date of Patent: May 28, 1985

[54] REGULATING WHEELHEAD DRIVE

[75] Inventors: William E. Shank; Kenneth K. Bercaw, both of Waynesboro, Pa.

[73] Assignee: Litton Industrial Products, Inc., Waynesboro, Pa.

[21] Appl. No.: 414,846

[22] Filed: Sep. 3, 1982

[51] Int. Cl.³ ............................ F16B 2/00; F16D 3/04
[52] U.S. Cl. ....................................... 403/26; 403/16; 403/259; 464/102; 464/901
[58] Field of Search .................. 406/16, 259, 334, 343, 406/361, 26; 464/102, 103, 104, 901, 178

[56] References Cited

U.S. PATENT DOCUMENTS

| 982,403 | 1/1911 | Whitton | 403/16 |
|---|---|---|---|
| 1,303,447 | 5/1919 | Andrews | 403/334 X |
| 1,508,085 | 9/1924 | Cooper | 464/104 X |
| 1,650,557 | 11/1927 | Weingartner | 464/104 |
| 1,823,032 | 9/1931 | DeVlieg | 464/102 X |
| 3,454,283 | 7/1969 | Benjamin et al. | 464/103 X |

FOREIGN PATENT DOCUMENTS 457769 9/1913 France ................................. 403/16

*Primary Examiner*—Stuart S. Levy
*Assistant Examiner*—Daniel P. Stodola
*Attorney, Agent, or Firm*—Spencer T. Smith

[57] ABSTRACT

A centerless grinder comprising a machine frame including bearings for supporting a shaft and a portion having a bore defined therein, a regulating wheelhead driving including a main drive shaft including a first shaft portion adapted to be supported by the bearings, a second threaded shaft portion axially adjacent the first shaft portion, and a third shaft portion extending through the bore, the third portion axially adjacent the second threaded portion and tapered inwardly toward the second shaft portion, a clamping ring having a threaded inner diameter for threadedly engaging with the second threaded shaft portion, and a plurality of holes defined in the outer diameter thereof for engagement by a suitable tool for rotating the clamping ring, a drive coupling having a tapered bore defining a surface for mating engagement with the tapered third shaft portion, and a threaded outer diameter, and drive lugs on the end remote from the first shaft portion, and a locking ring having a threaded inner diameter for threadedly engaging the threaded outer diameter of the drive coupling, and a plurality of holes defined in the outer diameter thereof for engagement by a suitable tool for rotating the locking ring, the locking ring being threadedly rotatable from a first position forcefully engaging and locking the clamping ring to a second position forcefully engaging the portion of the machine frame having the bore defined therein to break the frictional bond between the drive coupling and the tapered shaft portion.

1 Claim, 3 Drawing Figures

Fig._1

REGULATING WHEELHEAD DRIVE

BACKGROUND AND OBJECTS OF THE INVENTION

In centerless grinding machines where frequent removal of wheelhead spindles is required as part of the normal operation of the machine, it becomes very desirable to be able to make such changes without affecting other elements of the drive train. Commonly, such a changeover requires removing gear housings or other major machine elements.

It is, therefore, an object of the present invention to provide a regulating wheelhead drive for a centerless grinder.

It is further an object of the invention to provide a drive which is independently supported in its bearing system.

It is also an object of the invention to provide a drive which powers a wheelhead whose spindle is independently supported in its bearing system.

It is also an object of the invention to provide a drive which can be engaged and disengaged without effecting either bearing system.

It is also an object of the invention to provide a drive whose coupling can accomodate axial misalignment of the workdrive and wheelhead spindle.

It is also an object of the invention to provide a drive which assures easy and positively verifiable engagement of drive to wheelhead.

DESCRIPTION OF THE PREFERRED EMBODIMENT

Figure 1:
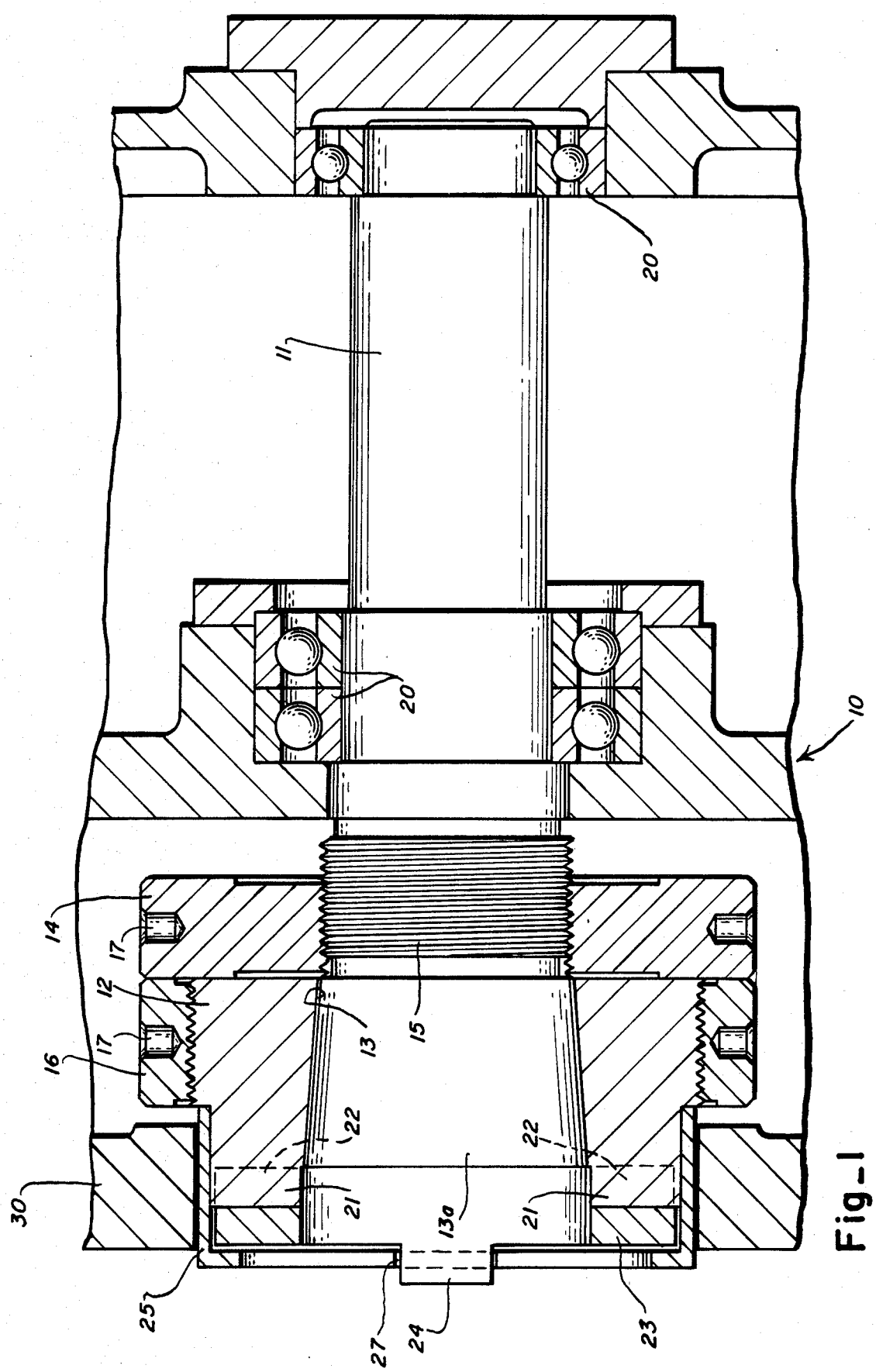
FIG. 1 is a sectional view of a regulating wheelhead, made in accordance with the teachings of the present invention in the engaged position.
Figure 2:
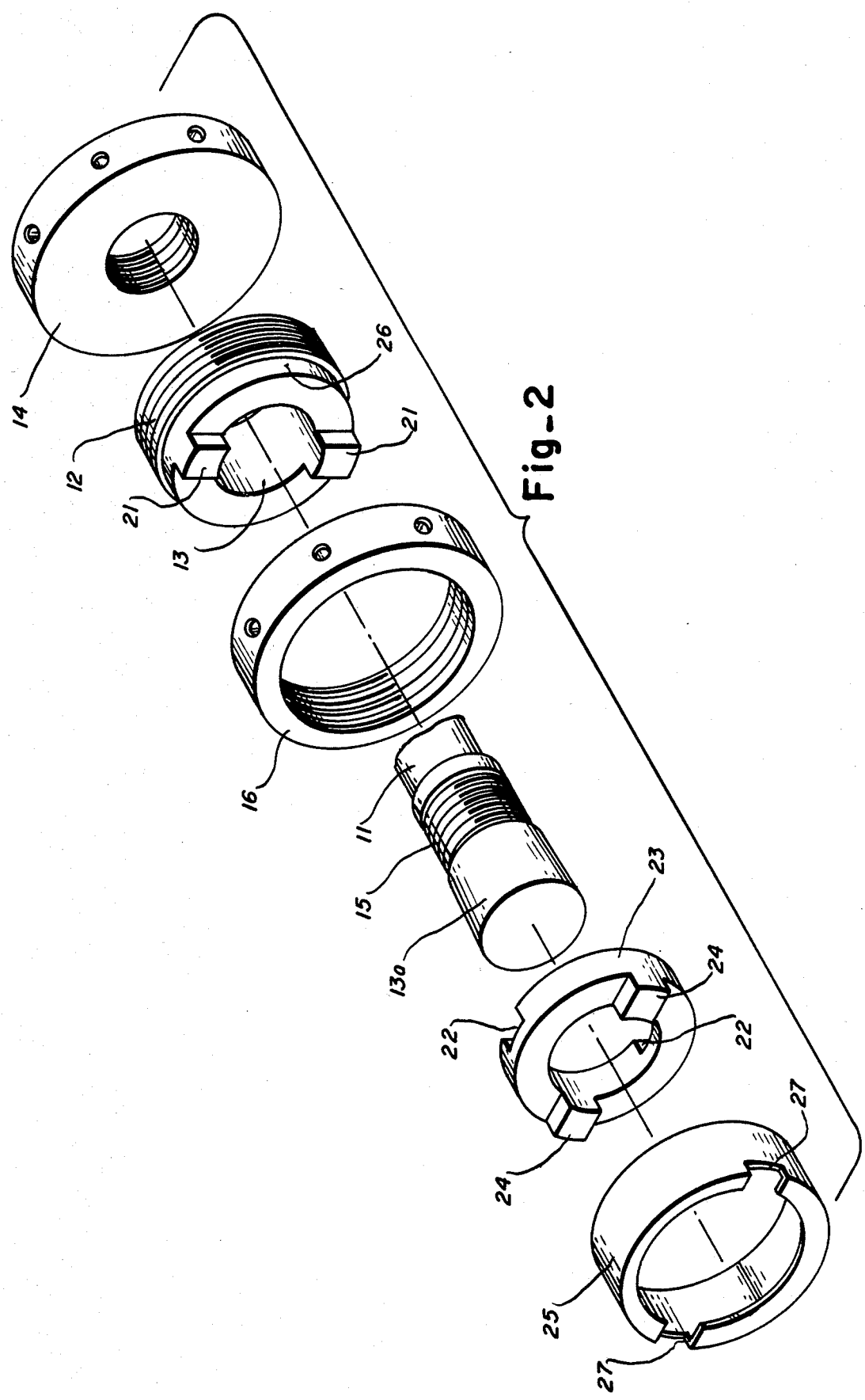
FIG. 2 is an exploded perspective view of the regulating wheelhead drive shown in FIG. 1.

As seen in FIG. 1 and 2, a centerless grinder regulating wheelhead drive 10 is comprised of a main drive shaft 11 independently supported by bearings 20. The drive coupling 12 has a tapered bore 13 which engages the tapered portion 13a of shaft 11 as the clamp ring 14 threads onto shaft 11 at its threaded portion 15 and circumferentially contacts the coupling 12 causing it to be displaced axially into forceful engagement. Forceful engagement is maintained as lock ring 16 is threaded onto the outer threaded diameter of drive coupling 12 and is circumferentially jammed against the clamp ring 14.

Drive coupling lugs 21 slidably engage the key slots 22 of floating drive plate 23 which is held in engagement as the retainer 25 is fitted over the floating drive plate 23 and is press fit onto the shoulder 26 of the drive coupling 12. Floating drive plate 23 is sized to allow limited radial movement of the plate within the inside diameter of the retainer 25. The lugs 24, which are free to move in clearance notches 27 and which are on an axis orthogonal to the axis of lugs 21, slidably engage corresponding key slots on the wheelhead (not shown) creating a coupling referred to in the industry as an Oldham coupling which accomodates limited axial misalignment of the wheelhead spindle and the drive shaft.

Figure 3:
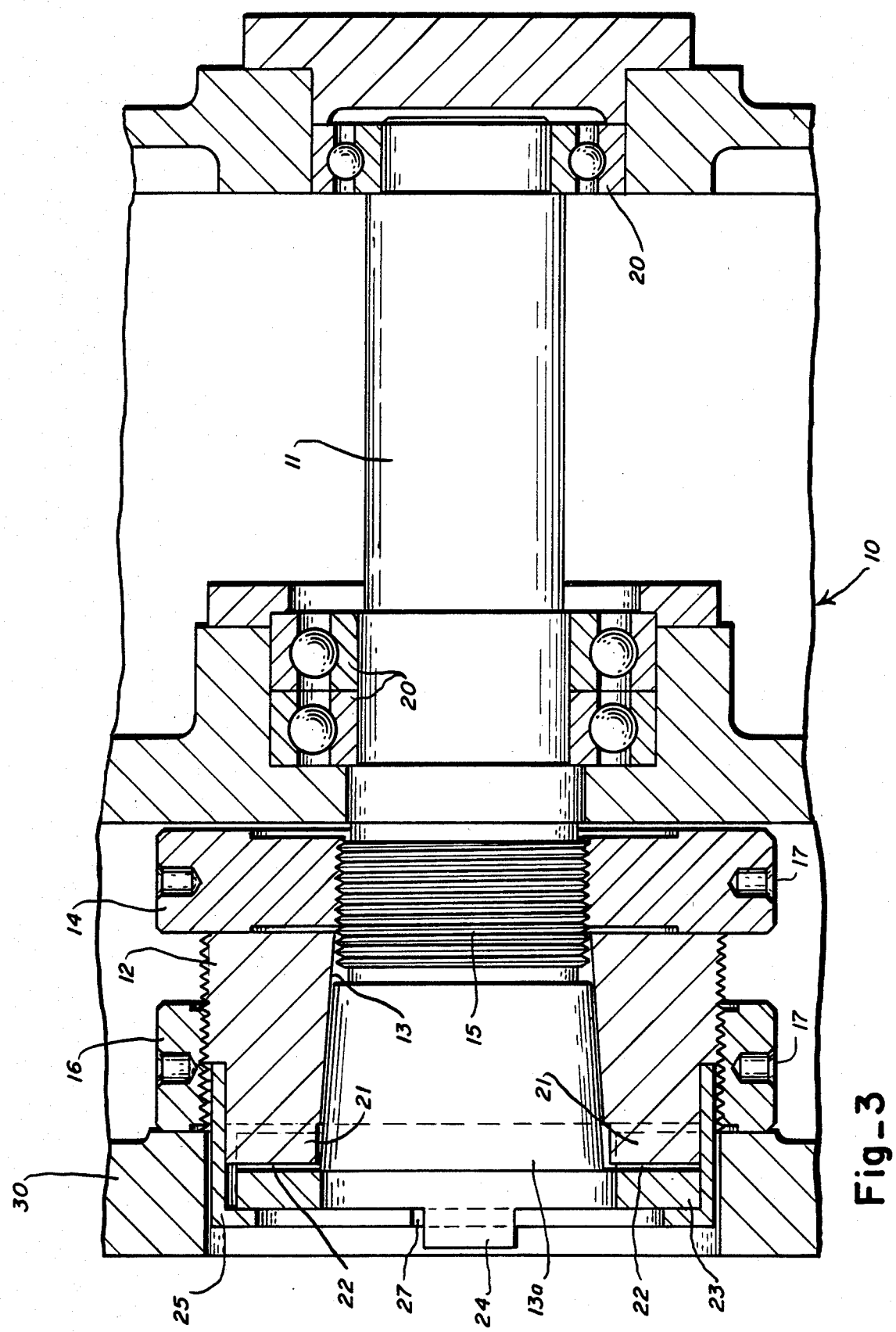
FIG. 3 is a sectional view of the drive shown in FIG. 1 in the disengaged position.

The coupling is disengaged from the wheelhead by axially withdrawing the drive lugs 24 from the wheelhead drive slots. Clamping ring 14, as best seen in FIG. 3, is threaded out of engagement with drive coupling 12 and lock ring 16 is threaded into circumferential engagement with the machine frame 30 forcefully causing drive coupling 12 to break free of shaft 11 and move axially away from the wheelhead, disengaging lugs 24 from the wheelhead key slots and leaving the wheelhead spindle free of the drive and readily removed and replaced Rotative displacement of the locking and clamping rings is achieved with the use of a suitable spanner wrench (not shown) which can engage a plurality of holes 17 defined in the outer periphery of these rings.

What is claimed is:

1. A centerless grinder comprising
a machine frame including bearing means for supporting a shaft and a portion having a bore defined therein
a regulating wheelhead drive including
a main drive shaft including
a first shaft portion adapted to be supported by said bearing means,
a second threaded shaft portion axially adjacent said first shaft portion, and
a third shaft portion extending through said bore, said third portion axially adjacent said second threaded portion and tapered inwardly toward said second shaft portion,
a clamping ring having
a threaded inner diameter for threadedly engaging with said second threaded shaft portion, and
a plurality of holes defined in the outer diameter thereof for engagement by a suitable tool for rotating the clamping ring,
a drive coupling having
a tapered bore defining a surface for mating engagement with said tapered third shaft portion, and
a threaded outer diameter, and
drive lugs on the end remote from said first shaft portion, and
a locking ring having
a threaded inner diameter for threadedly engaging the threaded outer diameter of said drive coupling, and
a plurality of holes defined in the outer diameter thereof for engagement by a suitable tool for rotating the locking ring,
said locking ring being threadedly rotatable from a first position forcefully engaging and locking said clamping ring to a second position forcefully engaging the portion of the machine frame having said bore defined therein to break the frictional bond between said drive coupling and said tapered shaft portion.

* * * * *